United States Patent [19]
Brown et al.

[11] 3,907,926
[45] Sept. 23, 1975

[54] BLENDS OF THERMOPLASTIC COPOLYETHERESTER WITH POLY-BUTYLENE TEREPHTHALATE

[75] Inventors: Morton Brown; Robert M. Prosser, both of Wilmington, Del.

[73] Assignee: E. I. Du Pont de Nemours and Company, Wilmington, Del.

[22] Filed: Dec. 19, 1973

[21] Appl. No.: 425,969

[52] U.S. Cl....... 260/860; 260/45.9 R; 260/45.95 R
[51] Int. Cl............................................. C08g 39/10
[58] Field of Search............. 260/860, 75 R, 45.9 R, 260/45.95 R, 45.95 H

[56] References Cited
UNITED STATES PATENTS
3,466,348  9/1969  Wiener............................... 260/860
3,784,520  1/1974  Hoeschele........................... 260/75

FOREIGN PATENTS OR APPLICATIONS
7,327,927  3/1974  France................................ 260/860
132,546    5/1949  Australia............................ 260/860

Primary Examiner—Morris Liebman
Assistant Examiner—T. Pertilla

[57] ABSTRACT

A substantially uniform blend of poly(butylene terephthalate), having a melt index of less than 50 at 250°C and a copolyetherester composition consisting essentially of a multiplicity of recurring long chain units and short chain ester units joined head-to-tail through ester linkages.

9 Claims, No Drawings

BLENDS OF THERMOPLASTIC COPOLYETHERESTER WITH POLY-BUTYLENE TEREPHTHALATE

BACKGROUND OF THE INVENTION

Linear copolyesters have been introduced heretofore for various purposes, particularly for the production of films and fibers, but the known polymers of this type have not been as effective as would be desired for certain applications. In particular, certain polymers of this type did not possess superior tear strength, tensile strength, flex life and abrasion resistance which would be required for many uses such as hydraulic hose and cable coverings. Recently, a copolyetherester has been discovered which possesses such properties. Although this copolyetherester is significantly superior to those previously known in the art in many regards it has not been suited for all specialty uses. In particular, rather unique properties are needed for airbrake tubing which is utilized in the automotive and trucking industries. Specifically, such tubing needs a high Young's modulus to resist bursting at temperatures above freezing and outstanding low temperature impact strength and flexibility.

SUMMARY OF THE INVENTION

According to this invention there is provided an improved copolyetherester-containing blend which has high Young's modulus at room temperature and above and also possesses good low temperature impact strength and flexibility. Additionally, it possesses other desired qualities such as good abrasion resistance, tear strength, resistance to flex cut growth and chemical resistance including resistance to fuels and lubricants. The blend consists essentially of poly(butylene terephthalate) in admixture with the copolyetherester. The poly(butylene terephthalate) is present in an effective amount which will usually be between about 5 and 200 parts of poly(butylene terephthalate) per 100 parts of the copolyetherester. The poly(butylene terephthalate) has a melt index not greater than 50 at 250°C and preferably a melt index of between about 25 and 1. Optionally the blend may contain an effective amount, e.g. 0.5 to 5 weight percent of an antioxidant, preferably 4,4′-bis($\alpha,\alpha$-dimethylbenzyl) diphenylamine.

The copolyetherester polymer which is blended with the poly(butylene terphthalate) consists essentially of a multiplicity of recurring intralinear long-chain and short-chain ester units connected head-to-tail through ester linkages, said long-chain ester units being represented by the following structure:

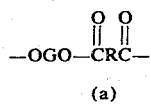

(a)

and said short-chain ester units being represented by the following structure:

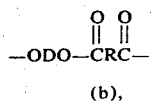

(b), wherein:

G is a divalent radical remaining after removal of terminal hydroxyl groups from poly(alkylene oxide) glycols having a carbon-to-oxygen ratio of about 2.0–4.3 and molecular weight between about 400 to 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the provisos that the short-chain ester units constitute about 15–95% by weight, preferably 25–90% by weight, and most preferably 45–65 percent by weight of the copolyetherester and, ergo, the long-chain ester units constitute about 5 to 85% by weight, preferably 10–75% by weight and most preferably 35–55% by weight of the copolyetherester.

DETAILED DESCRIPTION

The term "long-chain ester units" as applied to units in the copolyetherester polymer chain refers to the reaction product of a long-chain glycol with a dicarboxylic acid. Such "long-chain ester units", which are a repeating unit in the copolyetheresters used in this invention, correspond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(alkylene oxide) glycols having a carbon-to-oxygen ratio of about 2.0–4.3

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in the polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2,dimethyltrimethylene, hexamethylene, and decamethylene glycols dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred alipahtic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is preferred that at least about 50% of the short segments are identical and that the identical segments form a homopolymer in the fiber-forming molecular weight range (molecular weight >5000) having a melting point of at least 150°C. and preferably greater than 200°C. Copolyetheresters meeting these requirements exhibit a useful level of properties such as tensile strength and tear strength. Polymer melting points are conveniently determined by a differential scanning calorimetry.

The short-chain ester units will constitute about 15–95 weight percent of the copolyetherester. The remainder of the copolyetherester will be the long segments, ergo the long segment will comprise about 5–85 weight percent of the copolyetherester. Copolyetheresters in which the short-chain units comprise 25–90 weight percent with 10–75 weight percent long-chain units are preferred.

The copolyetherester is blended with an effective amount of poly(butylene terephthalate) to achieve a resulting blend which has the desired characteristics; namely, high initial modulus at temperatures above freezing and good low temperature impact strength and flexibility as well as good abrasion resistance, tear strength, resistance to flex cut growth and chemical resistance. Such a blend is particularly useful for preparing extruded tubing for use in air brake hoses utilized in the trucking industry and in general for pneumatic tubing for use at moderate pressures, i.e., 1000–2000 psi.

The poly(butylene terephthalate) is blended with the above-described copolyetherester in the ratio of about 5–200 parts by weight of poly(butylene terephthalate) per 100 parts of copolyetherester, preferably 10 to 60 parts by weight of poly(butylene terephthalate).

The poly(butylene terephthalate) which is to be utilized will have a melt index not greater than 50 and preferably between 25 to 1. If the melt index is higher than 50 the impact resistance of the blend is decreased and processing characteristics of the blend may be adversely affected. Poly(butylene terephthalate) having a melt index of less than 1 can be used in preparing the blends, but such polymer is not preferred because of cost and some loss of extrudability. Melt index is determined for the poly(butylene terephthalate) by the method of ASTM D1238 at 250°C. employing a load of 2160 g. The required poly(butylene terephthalate) can be prepared by conventional transesterification and polycondensation steps starting with dimethyl terephthalate and 1,4-butanediol. The above-described poly(butylene terephthalate) is also available commercially.

With regard to the manufacture of the copolyetheresters, they may be made by a conventional ester interchange reaction. A preferred procedure involves heating the dicarboxylic acid, e.g. dimethyl ester of terephthalic acid with a long chain glycol, e.g., poly(tetramethylene oxide)glycol having a molecular weight of about 600–2,000 and a molar excess of diol, e.g. 1,4-butanediol in the presence of a catalyst at about 150°–260°C. and a pressure of 0.5 to 5 atmospheres, preferably ambient pressure, while distilling off methanol formed by the ester interchange. Depending on temperature, catalyst, glycol excess, and equipment, this reaction can be completed within a few minutes e.g., 2 minutes to a few hours, e.g. 2 hours.

Concerning the molar ratio of reactants, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyetherester units. Best results are usually obtained when this final distillation or polycondensation is run at less than about 5mm. pressure and about 200°–270°C. for less than about two hours e.g. 0.5 to 1.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used alone or in combination with magnesium or calcium acetates are preferred. Complex titanates, such as Mg[HTi(OR)$_6$]$_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2% by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butane diol in terphenyl, are conveniently removed during high polymerization by azeotropic distillation. Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of diacid and polymeric glycol present in the reaction mixture. When mixtures of low molecular weight diols are employed, the amounts of each diol incorporated are largely a function of the amounts of the diols present, their boiling points, and relative reactivities. The total amount of diol incorporated is still the difference between moles of diacid and polymeric glycol.

Preferred copolyetheresters which are blended by the process of this invention are those prepared from dimethyl terephthalate, 1,4-butanediol and poly(tetramethylene oxide) glycol having a molecular weight of about 600–2000 or poly(ethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water. Most preferred are copolyetheresters containing 45–65% by weight of short-chain ester units derived from terephthalate and 1,4-butanediol.

The most preferred copolyetherester compositions also contain (A) 0.5 to 5 weight percent of an antioxidant, preferably 4,4'-bis($\alpha,\alpha$-dimethylbenzyl)diphenylamine, 1,3,5-tris(3,5-di-tert-butyl-4-hydroxyhydrocinnamoyl) hexahydro-s-triazine or 1,6-bis[3-(3,5-di-tert-butyl-4-hydroxyphenyl)propionamido]hexane. Optionally it may also contain a stabilizer, e.g. 0.5 to 3.0 weight percent of amide linkages, preferably provided by a copolymer of polycaprolactam and polyhexamethylene adipamide or terpolymer of polycaprolactam, polyhexamethylene adipamide and polyhexamethylene sebacamide.

The antioxidant and the amide may be added at any time during the preparation of the copolyetherester or following its preparation. Preferably an antioxidant should be present during the polycondensation aspect of the reaction in an amount of at least about 0.2 percent by weight based on the estimated yield of copolyetherester product, preferably in an amount of 0.5 to 3.0 percent by weight. It is preferred that a suitable antioxidant be present at any point in the process where the poly(alkylene oxide) glycol is exposed to elevated temperatures, e.g. above about 100°C. The antioxidant, depending on its melting point, may be added as a solid, a molten liquid, or as a solution or dispersion in one or more of the reactants. In batch operation, it is conveniently added as a solid or as a solution or dispersion in the diol or the poly(alkylene oxide)glycol at the time of charging the reactor. In continuous operation, the antioxidant is most conveniently added as a solution or dispersion in the diol and/or glycol entering the process. The antioxidant may, of course, be introduced at later stages in the process and even after preparation of the copolyetherester is complete. It is usually convenient to add the total amount of antioxidant desired in the finished copolyetherester during its preparation; however, additional amounts of antioxidant can be added to the finished copolyetherester by melt blending.

The resulting copolyetherester may be blended by any of several techniques with the poly(butylene terephthalate). For best results, in preparing the blends of this invention, the components must be thoroughly and uniformly blended, otherwise localized areas will differ in properties. The compositions may be prepared by heating the components to a temperature sufficient to soften them and agitating until a uniform blend is formed. The temperature required to soften or melt the components depends on the particular copolyetherester and the melt index of the poly(butylene terephthalate). Generally, it will be in the range of about 200° to 275°C., preferably between about 210° and 250°C. Needless to say, depending on the amount of short-chain segments present in the copolyetherester there will be a good deal of variation in the broad range; operating most efficiently within such temperature range will present no difficulty for one skilled in the art. For instance, if the short-chain segments are derived from terephthalic acid and 1,4-butanediol and are between about 45 through 65% by weight of the copolyetherester and the glycol is polytetramethylene ether glycol, a useful range of temperature for blending the poly(butylene terephthalate) and the copolyetherester will be between about 215° and 250°C.

The pressure utilized during blending may vary broadly; but in most instances ambient pressure is satisfactory. On occasion higher pressures may be inherent due to the nature of the equipment in which blending is performed.

The mixing or blending of the poly(butylene terephthalate) and the copolyetherester is preferably accomplished by means of extrusion blending. Suitable devices for the blending include single screw extruders, twin screw extruders, internal mixers such as the Banbury Mixer, heated rubber mills (electric or oil heat) or a Farrell continuous mixer. Injection molding equipment can also be used to accomplish blending just prior to molding, but care must be taken to provide sufficient time and agitation to insure uniform blending prior to molding.

The resulting blends may be utilized as previously indicated in airbrake hose and pneumatic tubing in general.

All parts, proportions and percentages disclosed herein are by weight unless otherwise indicated.

The following examples further illustrate the invention:

EXAMPLES

The following ASTM methods are employed in determining the properties of the polymer compositions prepared in the examples which follow:

| | |
|---|---|
| Stress/Strain Properties* including moduli at 5, 10, 20, 25, 100 and 300%, tensile at break, elongation at break and yield strength | D 412 |
| Tensile Modulus (Young's modulus) | D 638 |
| Flexural Modulus | D 790 |
| Hardness, Shore D | D1484 |
| Torsional Modulus, Clash-Berg | D1043 |
| Melt Index** | D1238 |

*Cross-head speed 2''/minute if not stated otherwise.
**2160 g load, temperature 250°C.

Inherent viscosities of the polymers in the following examples are measured at 30°C. at a concentration of 0.1g./dl. in m-cresol.

The following catalyst is used in preparing the copolyesters of the examples:

Catalyst

To 425 parts of anhydrous 1,4-butanediol in a round bottom flask is added 23.32 parts of tetrabutyl titanate. The mixture is agitated at 50°C for 2–3 hours until the small amount of solids originally present disappear.

Copolyester A is prepared by placing the following materials in an agitated flask fitted for distillation:

| | |
|---|---|
| Polytetramethyleneether glycol; number average molecular weight about 975 | 10.75 parts |
| 1,4-Butanediol | 28.0 parts |
| Dimethyl terephthalate | 36.45 parts |
| Dimethyl phthalate | 3.65 parts |
| 4,4'-bis (alpha,alpha-dimethylbenzyl) diphenylamine | 0.57 parts |
| Catalyst | 1.1 parts |

A stainless steel stirrer with a paddle cut to conform with the internal radius of the flask is positioned about one-eighth inch from the bottom of the flask and agitation is started. The flask is placed in an oil bath at 160°C., agitated for five minutes and then the catalyst is added. Methanol distills from the reaction mixture as the temperature is slowly raised to 250°C. over a period of one hour. When the temperature reaches 250°C., the pressure is gradually reduced to 0.3 mmHg within 20 minutes. The polymerization mass is agitated at 250°C./0.3 mmHg for 35 minutes. The resulting viscous molten product is scraped from the flask in a nitrogen (water and oxygen free) atmosphere and allowed to cool. The inherent viscosity of the product at a concentration of 0.1g./dcl. in m-cresol at 30°C. is 1.35. Samples for heat aging and physical testing are prepared by compression molding at about 240°C. for one minute and cooling rapidly in the press. The polymer has a Shore D hardness of about 63.

Copolyester B containing a lower proportion of short chain ester units is prepared by substantially the same procedure from the following materials:

|  | Parts |
|---|---|
| Polytetramethyleneether glycol; number average molecular weight about 975 | 38.5 |
| 1,4-Butanediol | 36.5 |
| Dimethyl terephthalate | 60.0 |
| 4,4'-bis (alpha,alpha-dimethylbenzyl) diphenylamine | 1.05 |
| Catalyst | 2.1 |

The polymer has an inherent viscosity of 1.40 and a Shore D hardness of 55.

Copolyester C is prepared by substantially the same procedure used for Copolyester A from the following materials:

|  |  |
|---|---|
| Polytetramethyleneether glycol; number average molecular weight about 975 | 88.0 parts |
| 1,4-Butanediol | 73.0 parts |
| Dimethyl terephthalate | 88.0 parts |
| Dimethyl isophthalate | 24.7 parts |
| 4,4'-bis($\alpha,\alpha$-dimethyl) diphenylamine | 2.0 parts |
| Catalyst | 4.0 parts |

This polymer has an inherent viscosity of about 1.45 and a Shore D hardness of 40.

EXAMPLE 1

A blend (1-A) of Copolyesters C and poly(butylene terephthalate) is prepared by dry-blending pellets of the two polymers and mixing the dry-blend in a twin-screw extruder (28 mm. Werner and Pfleiderer) at 230°–240°C. The extrudate is quenched in cold water, pelletized and then compression molded at about 205°C to provide samples suitable for physical testing. A second blend (1-B) is prepared from Copolyester B and poly(butylene terephthalate) by substantially the same mixing procedure and compression molded at 205°C to provide samples for testing. Physical properties of these two blends are listed in Table I. For comparison the physical properties of Copolyester A, i.e., the straight copolyetherester without added poly(butylene terephthalate), are also presented in Table I. It should be noted that the proportions of Copolyesters B and C and poly(butylene terephthalate) used in preparing the two blends, yield compositions containing an overall concentration of butylene terephthalate ester units equal to the butylene terephthalate ester unit content of the control copolyetherester, namely, Copolyester A.

The poly(butylene terephthalate) used in preparing these blends has a melt index of 3.35 at 250°C.

TABLE I

|  | Blend 1-A | Blend 1-B | Control |
|---|---|---|---|
| Copolyester C, parts | 46.3 | — | — |
| Copolyester B, parts | — | 78.5 | — |
| Poly(butylene terephthalate), parts | 53.7 | 21.5 | — |
| Copolyester A, parts | — | — | 100 |
| S/S, at 25°C. |  |  |  |
| Tensile at Break | 6620 | 4765 | 7800 |
| Elongation at Break | 490 | 570 | 635 |
| 100% Modulus, psi | 3100 | 2840 | 2700 |
| 300% Modulus, psi | 3470 | 3150 | 3740 |
| Moduli at 25°C. |  |  |  |
| at 5% elongation | 2300 | 1470 | 1375 |
| at 10% elongation | 2750 | 2230 | 2000 |
| at 20% elongation | 3000 | 2800 | 2455 |
| Flexural Modulus, psi | 127000 | 57000 | 48500 |
| Torsional Moduli, psi |  |  |  |
| Room Temperature, 72°F | 29000 | 13500 | 12000 |
| 40°F | 31900 | 16300 | 20000 |
| 20°F | 32700 | 18400 | 31000 |
| 0°F | 34500 | 21000 | 42000 |
| −20°F | 38800 | 26600 | 61000 |
| −40°F | 44300 | 35800 | 77000 |
| −60°F | 54000 | 51200 | 87000 |

It should be noted that the blends exhibit higher moduli at low extension, higher flexural modulus and higher torsional modulus at room temperature than does the control. These physical properties are indicative of higher burst strengths for the blends relative to the control. Surprisingly the torsional moduli of the blends at 0°F and lower temperatures is signficiantly lower than the torsional moduli of the control indicating the greater flexibility of the blends at low temperatures relative to the control.

EXAMPLE 2

A series of 5 blends (2-A through 2-E) are prepared by mixing Copolyester B with increasing amounts of poly(butylene terphthalate) having a melt index of 6.8 at 250°C. The blends are prepared by dry-blending pellets of the two polymers and mixing the dry-blend in a single-screw extruder (L/D=24; equipped with a two-stage mixing screw having a final compression ratio of 4.5:1). The melt emerging from the extruder had a temperature in the range of 225°–250°. The extrudates were quenched in cold water, pelletized and compression molded at 205°C. to provide samples for physical testing. The amounts of polymers used in preparing the blends and their physical properties are given in Table II. The physical properties of unblended Copolyester B are included for comparison.

TABLE II

| BLEND | 2-A | 2-B | 2-C | 2-D | 2-E |
|---|---|---|---|---|---|
| Copolyester B, parts | 100 | 100 | 100 | 100 | 100 | 100 |
| Poly(Butylene Terephthalate), parts | — | 10 | 20 | 30 | 40 | 50 |
| Tensile Modulus, psi | 28,500 | 32,500 | 43,250 | 53,000 | 59,000 | 68,000 |
| Stress at 25% Strain 2''/min., 72°F | 1,800 | 2,260 | 2,550 | 3,060 | 3,280 | 3,450 |
| Torsional Modulus, psi |  |  |  |  |  |  |
| 72°F (22°C) | 7,800 | 9,500 | 13,000 | 19,000 | 20,250 | 22,000 |
| −40°F (−40°C) | 19,600 | 24,000 | 31,500 | 37,600 | 47,000 | 55,000 |
| Hardness, Shore D | 55 | 62 | 64 | 67 | 68 | 70 |
| Tensile Strength, psi | 5,200 | 4,865 | 4,140 | 4,600 | 5,780 | 4,800 |
| Elongation at Break, % | 605 | 400 | 345 | 335 | 340 | 350 |
| Yield Strength, psi | 2,200 | 2,400 | 3,030 | 3,300 | 3,420 | 3,600 |

It should be noted that blends 2-C, 2-D and 2-E each have a tensile modulus higher than Copolyester A and a torsional modulus at −40°C significantly lower than Copolyester A. This combination of properties makes the blends outstanding for use in pneumatic tubing where high burst strength and low temperature flexibility are required.

Substantially the same results are obtained when the blends are prepared by mixing a dry-blend in a reciprocating screw injection molding machine fitted with a general purpose plastic molding screw L/D=18 with a compression ratio of 3:1. Melt temperatures range from 215°–230°C. The blends are directly molded into test bars.

EXAMPLE 3

Two blends (3-A and 3-B) are prepared by mixing Copolyester A and poly(butylene terephthalate) by the single-screw extruder procedure described in Example 2. After compression molding, physical properties are determined. Proportions and properties are given in Table III. Properties of unblended Copolyester A are included for comparison.

TABLE III

| | | Blend 3-A | Blend 3-B |
|---|---|---|---|
| Copolyester A, parts | 100 | 100 | 100 |
| Poly(butylene terephthalate), parts Melt index 6.8 | — | 5 | 10 |
| Tensile Modulus, psi | 48,000 | 57,000 | 63,000 |
| Stress at 25% Strain 2''/min., 72°F | 2,800 | 2,940 | 3,380 |
| Torsional Modulus, psi | | | |
| 72°F (22°C) | 13,500 | 14,500 | 22,250 |
| −40°F (−40°C) | 86,000 | 93,000 | 103,000 |
| Hardness, Shore D | 63 | 65 | 68 |
| Tensile Strength, psi | 6,250 | 6,000 | 5,850 |
| Elongation at Break, % | 500 | 395 | 385 |
| Yield Strength, psi | 2,650 | 3,050 | 3,450 |

What is claimed is:

1. A substantially uniform blend of (a) about 5–200 parts by weight of poly(butylene terephthalate) having a melt index not greater than 50 at 250°C with a 2160-g. load and (b) 100 parts by weight of a copolyetherester composition consisting essentially of a multiplicity of recurring long chain ester units and short chain ester units joined head-to-tail through ester linkages, said long chain ester units being represented by the formula

and said short chain units being represented by the formula

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyester.

2. The blend of claim 1 wherein the poly(butylene terephthalate) has a melt index of between 25 and 1.

3. The blend of claim 1 wherein the poly(butylene terephthalate) is present in the amount of 10 to 60 parts by weight per 100 parts by weight of copolyetherester.

4. The composition of claim 1 additionally containing an effective amount of an arylamine or hindered phenol antioxidant.

5. The composition of claim 3 wherein said poly(alkylene oxide) glycol is poly(tetramethylene oxide) glycol having a molecular weight of 600–2000, the diol is 1,4-butanediol and the dicarboxylic acid is a mixture of dimethyl terephthalate and dimethyl phthalate or dimethyl isophthalate.

6. The composition of claim 5 wherein said dicarboxylic acid is dimethyl terephthalate.

7. The composition of claim 6 wherein said short chain segments constitute 45–65% by weight of the copolyetherester.

8. The composition of claim 1 containing as an antioxidant 4,4'-bis(α,α-dimethylbenzyl)diphenylamine in the amount of 0.5 to 5 weight percent.

9. The composition of claim 8 additionally containing an effective amount of a stabilizer which consists essentially of 0.5–3.0 weight percent of amide linkages.

* * * * *